3,511,854
SYNTHESIS OF 4-OXO-4,5,6,7-TETRAHYDRO-
BENZOTHIOPHENE
Roger P. Napier and Chin-Chiun Chu, Piscataway, N.J.,
assignors to Mobil Oil Corporation, a corporation of
New York
No Drawing. Filed June 27, 1967, Ser. No. 649,154
Int. Cl. C07d 63/18
U.S. Cl. 260—332.3    6 Claims

ABSTRACT OF THE DISCLOSURE 4-oxo-4,5,6,7-tetrahydrobenzothiophene is prepared by reacting 3-mercaptocyclohexanone with glyoxal in the presence of a protic acid catalyst. The 3-mercaptocyclohexanone can have substituents on the 4, 5 or 6 positions, thus giving the corresponding substituted derivative of the 4-oxo-4,5,6,7-tetrahydrobenzothiophene. The products obtained by this process can be dehydrogenated to 4-hydroxybenzothiophene or substituted derivatives thereof, e.g. with elemental sulfur (U.S. Pat. No. 3,317,552). The 4-hydroxybenzothiophenes can then be converted to form 4-benzothienyl carbamates which are effective pesticides as shown in U.S. Pats. Nos. 3,288,673 and 3,288,808.

BACKGROUND OF THE INVENTION

Field of the invention

This invention relates to a process for producing 4-oxo-4,5,6,7-tetrahydrobenzothiophene and its substituted derivatives.

Description of the prior art 4-oxo-4,5,6,7-tetrahydrobenzothiophene has been prepared by the ring closure of an acid chloride of 4-(2-thienyl) butyric acid in carbon disulfide and in the presence of stannic chloride [Fieser et al., J. Am. Chem. Soc., 57, 1611 (1935)]. This method requires a very pure acid chloride which, however, is unstable and difficult to keep in the pure state. Consequently, yields, particularly on large scale, are erratic and reproducibility is poor. For producing commercial quantities of 4-oxo-4,5,6,7-tetrahydrobenzothiophene the desideratum is a facile and readily controlled process.

SUMMARY OF THE INVENTION

This invention provides a process for producing 4-oxo-4,5,6,7-tetrahydrobenzothiophene and substituted derivatives thereof, that comprises reaction a cyclohexanone compound having the formula:

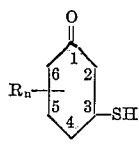

wherein $n$ is 0 to 3, R occupies any 4–6 position on the ring and is selected from the group consisting of alkyl alkenyl ($C_2$–$C_8$), alkoxy ($C_1$–$C_4$), alkylthio ($C_1$–$C_4$), ($C_1$–$C_4$), di($C_1$–$C_4$)alkylamino and cyano with glyoxal in the presence of a protic acid catalyst.

DESCRIPTION OF SPECIFIC EMBODIMENTS

One reactant used in the process of this invention is 3-mercaptocyclohexanone which can contain ring substituents as indicated in the structural formula set forth hereinbefore. Non-limiting examples of this reactant are 3-mercaptocyclohexanone; 4-methyl - 3 - mercaptocyclohexanone; 3-mercapto - 4 - octylcyclohexanone; 3-mercapto - 5 - butenylcyclohexanone; 3 - mercapto-6-propoxycyclohexanone; 3-mercapto - 4 - diethylaminocyclohexanone; 3-mercapto-5-hexenylcyclohexanone; 3 - mercapto-4-vinylcyclohexanone; 3-mercapto - 5 - cyanocyclohexanone; and 3-mercapto - 4 - ethylmercaptocyclohexanone.

Glyoxal is a commercially available material which is usually sold in an aqueous solution containing 30–40% glyoxal by weight. As described in Ind. Eng. Chem. 43, 786–794 (1951) glyoxal is prepared by the vapor phase oxidation of ethylene glycol in the presence of copper oxide catalyst and using halogen to inhibit side reactions.

The reaction (concurrent condensation and ring closure) involved in the process of this invention can be carried out at atmospheric pressures under reflux conditions, usually at temperatures of between about 70° C. and about 1000° C. It is preferred, however, to operate at the more elevated temperatures and a temperature of about 85–100° C. has been found feasible. If a pressure vessel is used, temperatures up to about 120° C. can be employed, in order to speed up the reaction. Temperatures higher than 120° C. should be avoided, however, because the reaction products show some thermal instability in the presence of the protic acids.

The catalyst used in this reaction is a protic acid. The term includes organic acids, such as alkylbenzene sulfonic acids and mineral acids, such as hydrochloric acid, phosphoric acid and sulfuric acid. Protic acid activated clays and sulfonated organic resins, e.g. sulfonated styrene-divinylbenzene copolymers, have been found effective protic acids in this process.

The reaction proceeds rapidly, smoothly, and in good yield when an inert solvent, such as benzene, toluene or xylene, is used to moderate the reaction. The amount of solvent used will generally be between about 2 volumes and about 10 volumes per volume of starting material. Other aromatic, acyclic, and alicyclic hydrocarbons can be employed, but one should be chosen that will form an azeotrope with water which refluxes at the temperatures set forth hereinbefore, preferably at 85–100° C.

The following examples demonstrate the process of this invention. It must be strictly understood, however, that this invention is not to be limited to the specific reactants and conditions employed, or to the operations and manipulations involved. Other reactants and conditions can be used, as is described hereinbefore.

EXAMPLE 1

A mixture of 15 g. of 40% glyoxal solution in water and 12 g. of p-dodecylbenzene sulfonic acid was heated to 80° C. Then, about 13 g. of 3-mercaptocyclohexanone in 50 ml. of toluene was added over a 10-minute period. The reaction mixture was refluxed a total of 2 hours. The toluene layer was removed and combined with a toluene wash of the aqueous layer. After removal of toluene solvent 4-oxo-4,5,6,7-tetrahydrobenzothiophene was recovered in 90% yield by distillation at 150° C. at 18 mm. Hg pressure.

EXAMPLE 2

A mixture of 40 g. of a 30% glyoxal solution in water, 1 g. phosphoric acid, and 11 g. of 3-mercaptocyclohexanone in 55 ml. benzene was refluxed for 3 hours. The benzene layer was removed and combined with a benzene wash of the aqueous layer. After removal of the benzene solvent, 9.0 g. of 4-oxo-4,5,6,7-tetrahydrobenzothiophene (identified by comparison with the IR and NMR spectra of authentic material) was isolated by distillation at 150° C. and 18 mm. Hg pressure. The yield of the reaction was about 70%. The product has M.P. 35–36° C.

EXAMPLE 3

A mixture of 62 g. of a 40% glyoxal solution in water, 30 g. of sulfonated styrene-divinylbenzene copolymer (Dowex 50W-X8) and 51 g. of 3-mercaptocyclohexanone in 25.5 ml. benzene was refluxed for 2 hours. The benzene layer was separated and combined with a benzene wash of the aqueous layer. The benzene was removed by distillation and the residue was distilled at 150° C. and 18 mm. Hg pressure to give 48 g. (80% yield) of 4 - oxo - 4,5,6,7 - tetrahydrobenzothiophene; M.P. 35–36° C.

EXAMPLE 4

3-mercaptocyclohexanone (12.8 g.) was added to a stirred mixture of 16 g. 40% glyoxal in water and 15 g. of protic acid-activated (Tonsil IFF) clay. The mixture was stirred and refluxed for 2 hours. This afforded a 55% yield of 4-oxo-4,5,6,7-tetrahydrobenzothiophene.

Although the present invention has been described with preferred embodiments, it is to be understood that modifications and variations may be resorted to, without departing from the spirit and scope of this invention, as those skilled in the art will readily understand.

What is claimed is:

1. A process that comprises reacting a cyclohexanone compound having the formula:

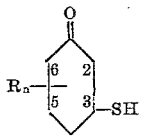

wherein $n$ is 0 to 3 and R occupies any 4–6 position on the ring and is selected from the group consisting of alkyl ($C_1$–$C_8$) and alkenyl ($C_2$–$C_8$), with glyoxal in the presence of a protic acid catalyst, under reflux conditions.

2. The process defined in claim 1, wherein said catalyst is p-dodecylbenzene sulfonic acid.

3. The process defined in claim 1, wherein $n$ is 0 and said catalyst is p-dodecylbenzene sulfonic acid.

4. The process defined in claim 1, wherein $n$ is 0 and said catalyst is phosphoric acid.

5. The process defined in claim 1, wherein $n$ is 0 and said catalyst is sulfonated styrene-divinylbenzene copolymer.

6. The process defined in claim 1, wherein $n$ is 0 and said catalyst is protic acid activated clay.

References Cited

UNITED STATES PATENTS

| | | | |
|---|---|---|---|
| 3,317,552 | 5/1967 | Kaufman | 260—304 |
| 3,346,591 | 10/1967 | Foster | 260—332.3 |
| 3,350,409 | 10/1967 | Kaufman | 260—332.3 |
| 3,357,997 | 12/1967 | Foster | 260—332.3 |
| 3,389,149 | 6/1968 | Glick | 260—332.3 |

NORMA S. MILESTONE, Primary Examiner

C. M. SHURKO, Assistant Examiner

U.S. Cl. X.R.

260—464, 586

PO-1050
(5/69)

UNITED STATES PATENT OFFICE
CERTIFICATE OF CORRECTION

Patent No. 3,511,854  Dated May 12, 1970

Inventor(s) Roger P. Napier and Chin-Chiun Chu

It is certified that error appears in the above-identified patent and that said Letters Patent are hereby corrected as shown below:

Column 1, line 62, after "alkyl" should read - "$(C_1-C_8)$" --.

Column 1, line 64, "$(C_1-C_4)$" repeated, eliminate first occurrence.

Column 2, line 17, should read -- 100°C -- not 1000°C.

SIGNED AND
SEALED
AUG 25 1970

(SEAL)
Attest:

Edward M. Fletcher, Jr.
Attesting Officer

WILLIAM E. SCHUYLER, JR.
Commissioner of Patents